S. GOLDFADEN.
PADDING ATTACHMENT FOR EYEGLASSES AND SPECTACLES.
APPLICATION FILED JULY 9, 1918.
1,285,984. Patented Nov. 26, 1918.
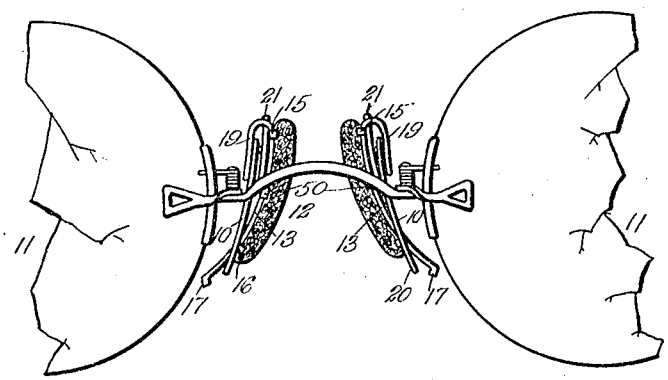
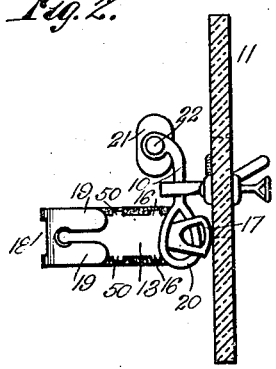
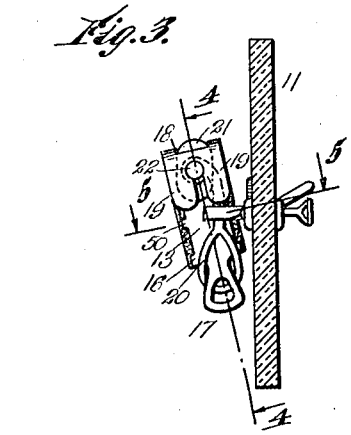
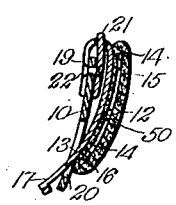
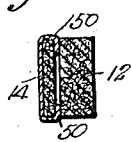
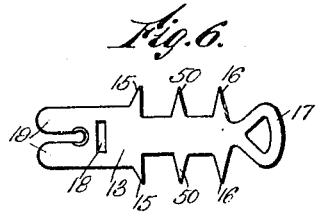
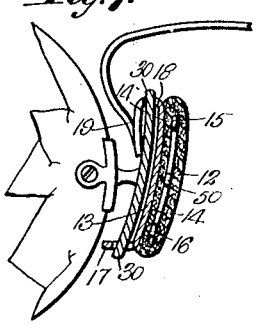
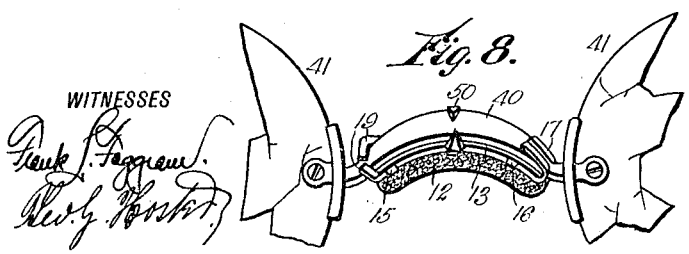
WITNESSES
INVENTOR
Samuel Goldfaden
BY
ATTORNEYS

UNITED STATES PATENT OFFICE.

SAMUEL GOLDFADEN, OF NEW YORK, N. Y., ASSIGNOR TO SOPHIE GOLDFADEN, OF NEW YORK, N. Y.

PADDING ATTACHMENT FOR EYEGLASSES AND SPECTACLES.

1,285,984.  Specification of Letters Patent.  Patented Nov. 26, 1918.

Application filed July 9, 1918. Serial No. 244,026.

*To all whom it may concern:*

Be it known that I, SAMUEL GOLDFADEN, a citizen of the United States, and a resident of the city of New York, borough of Manhattan, in the county and State of New York, have invented a new and Improved Padding Attachment for Eyeglasses and Spectacles, of which the following is a full, clear, and exact description.

The object of the invention is to provide a new and improved padding attachment for eyeglasses and spectacles and more especially designed to enable the wearer to wear the eyeglasses or spectacles with the utmost comfort and without danger of irritating or further irritating the already irritated sides or bridge of the wearer's nose by the usual clamping members of the eyeglasses or bridge of the spectacles. Another object is to permit of conveniently and quickly attaching the padding device to the clamping members of the eyeglasses or the bridge of the spectacles or detaching the padding attachment after the irritated skin is healed or hardened sufficiently to allow the use of the eyeglasses or spectacles without the padding attachment. Another object is to provide a padding attachment which is sanitary.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is an enlarged front elevation of a pair of eyeglasses provided with the padding attachment;

Fig. 2 is a transverse section of the same with one of the pads in partly attached position;

Fig. 3 is a similar view of the same with the pad in position;

Fig. 4 is a sectional front elevation of the same on the line 4—4 of Fig. 3;

Fig. 5 is a sectional plan view of the same on the line 5—5 of Fig. 3;

Fig. 6 is a face view of the pad holding plate;

Fig. 7 is a sectional front elevation of the padding attachment as applied to eyeglasses having a different form of clamping members from the ones shown in Figs. 1, 2, 3 and 4; and Fig. 8 is a rear elevation of the padding attachment as applied to spectacles.

The padding attachment for each nose clamping member 10 of a pair of eyeglasses 11 shown in Figs. 1, 2, 3, 4 and 5 comprises a pad 12 and a pad holding plate 13, of which the pad 12 is made of a strip of felt or a similar soft material having its end 14 doubled up. The holding plate 13 is provided at its sides with prongs 15 and 16 adapted to be bent over onto the doubled-up ends 14 of the pad 12 to fasten the latter in position on the holding plate 13. One end of the holding plate 13 is in the form of a loop 17 while the other end is provided with an opening 18 and with two lengthwise extending clamping claws or jaws 19. The loop 17 is adapted to be passed through a loop 20 formed on the clamping member 10 of the eyeglasses 11 at the time the plate is held in horizontal position, as shown in Fig. 2, and then the plate is given a quarter turn to interlock the loop 17 with the loop 20, as plainly shown in Figs. 3 and 4. The opening in the loop 20 is elongated in a vertical direction to permit of passing the loop 17 sidewise through the opening, as shown in Fig. 2, and after this has been done a quarter turn is given to the plate 13 to hold the loop 17 against disengagement from the loop 20. The opening 18 is next engaged with the upper end of the nose clamping plate 21 of the clamping member 10, after which the claws or jaws 19 are bent over onto the upper end of the member 10 with the jaws straddling the rivet 22 connecting the plate 21 with the member 10. It will be noticed that by the arrangement described the pad holding plate 13 can be readily attached to the nose clamping member 10 of the eyeglasses so that the pad 12 comes in contact with the sides of the nose of the wearer of the eyeglasses thus protecting the skin against undue pressure and thereby avoiding irritation of the skin. It will also be noticed that in case the skin is already irritated by previous contact with the clamping plate 21 the attachment of the pad to the member 10 brings the felt in contact with the irritated skin portion thus giving this portion a chance to heal.

In case the clamping member of the eyeglasses is in the form of a straight bar 30, as shown in Fig. 7, then the loop 17 is engaged with the lower end of this bar while the opening 18 is engaged with the upper end of the bar and the claws or jaws 19 are bent over onto the back of the bar 30 to fasten the pad in place.

When applying the padding attachment to the bridge 40 of spectacles 41, as shown in Fig. 8, then the loop 17 is split and its split members are bent onto one end of the bridge 40 while the claws or jaws 19 are bent onto the other end of the bridge to securely fasten the holding plate 13 and its pad 12 in position on the bridge 40. The holding plate 13 is provided, in addition to the prongs 15 and 16, with intermediate integral prongs 50 adapted to be bent over onto the doubled-up ends 14 of the pad 12 at the meeting edges of the said doubled-up ends, or to bend the said prongs 50 onto the bridge 40 to assist the loop member 17 and the jaws 19 to securely hold the plate 13 in position on the bridge 40.

It will be noticed that by the arrangement described the padding attachment can be readily applied to the clamping members of eyeglasses or the bridge of spectacles to protect the nose of the wearer against undue irritation, and in case the skin of the nose has been irritated by the previous use of eyeglasses or spectacles without the padding attachment then such irritated portions can readily heal if the eyeglasses or spectacles are provided with the padding attachment.

The padding attachment shown and described is very simple and durable in construction and can be quickly attached to the eyeglasses or spectacles or detached therefrom after the irritated skin is healed or hardened sufficiently to allow the use of the eyeglasses or spectacles without the padding attachment. It will further be noticed that the pad 12 of felt or like material can be readily renewed whenever deemed necessary to render the padding attachment extremely sanitary.

Having thus described my invention, I claim as new and desire to secure by Letters Patent:—

1. A padding attachment for eyeglasses and spectacles, comprising a pad and a holding plate for the pad, the holding plate being provided with means for fastening the pad in place and the holding plate being provided at one end with a loop and at the other end with claws, the said loop and claws being adapted to detachably engage the member to be padded.

2. A padding attachment for eyeglasses and spectacles, comprising a pad made of a strip of a soft padding material and having its ends doubled up, and a holding plate for supporting the pad provided at one end with a loop and at the other end with claws for fastening the plate to the member to be padded, the plate having integral clamping prongs at its sides bent over onto the doubled-up ends of the pad to hold the latter in place on the plate.

3. A padding attachment for eyeglasses and spectacles, comprising a pad made of a strip of a soft padding material and having its ends doubled up, and a holding plate for supporting the pad provided at one end with a loop and at the other end with claws for fastening the plate to the member to be padded, the plate having integral clamping prongs at its sides bent over onto the doubled-up ends of the pad to hold the latter in place on the plate, the plate having auxiliary integral clamping prongs adapted to be bent over onto the member to be padded.

4. A padding attachment for eyeglasses and spectacles, comprising a pad made of a strip of a soft padding material, and a holding plate provided at one end with a loop and at the other end with an opening and with lengthwise extending prongs, the plate being provided at its sides with integral end prongs and prongs intermediate the end prongs, the former engaging the said pad and the intermediate prongs being adapted to engage the member to be padded.

SAMUEL GOLDFADEN.